3,268,522
PREPARATION OF DICARBOCYANINE DYESTUFFS

Leslie M. Schenck, Mountainside, N.J., assignor to General Aniline & Film Corporation, New York, N.Y., a corporation of Delaware
No Drawing. Filed Jan. 31, 1962, Ser. No. 170,264
8 Claims. (Cl. 260—240.5)

This invention relates to an improved process for the preparation of dicarbocyanine dyestuffs.

There is disclosed in United States Patent 2,951,841, issued September 6, 1960, the preparation of dicarbocyanine dyestuffs by heating to reflux, in a solvent containing a tertiary amine, a mixture of a compound of the formula

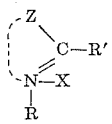

wherein R is an alkyl or aralkyl radical, R′ is a lower alkyl radical, X is the anion of a salt-forming acid such as —Cl, —Br, —I, —SO$_4$H, —SO$_3$CH$_3$, —SO$_3$C$_2$H$_5$, or —SO$_3$C$_6$H$_4$CH$_3$, and Z is the residue of a thiazole-, oxazole-, selenazole-, indoline-, oxazoline-, thiazoline-, selenazoline-, pyridine-, lepidine-, imidazole-, quinoline- or thiadiazole-nucleus, with a malonaldehyde diacetal having the formula

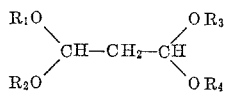

wherein R$_1$, R$_2$, R$_3$ and R$_4$ each represent an alkyl group of 1 to 8 carbon atoms.

The dicarbocyanine dyestuffs obtained in the aforesaid process have the following formula:

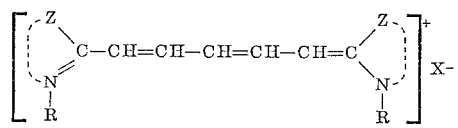

wherein R, Z and X have the significance indicated above.

As indicated in said patent, the tertiary amine—e.g. pyridine—can be used as the solvent medium, functioning also as the acid acceptor-condensing agent, or the mixture may contain as an additional diluent, an inert solvent such as isopropanol which is miscible with the tertiary amine.

It has beeen found that use of technical pyridine as the solvent-acid acceptor-condensing agent in the preparation of dicarbocyanine dyestuffs according to the aforesaid patent causes unexplained lowering in the yield of dyestuff, the amount produced differing by as much as 10% from the expected optimum value. Analysis of technical pyridines from different sources failed to indicate chemical differences or contaminants to which the observed lowering of the dicarbocyanine dyestuff yield could be ascribed. By "technical pyridine," I mean pyridine produced as a fraction of coal tar, bone oil or similar pyrogenous distillates obtained from nitrogenous organic material, or from acetaldehyde and ammonia—fractionated such as to yield a product still containing at least 1% by weight of nitrogen bases other than pyridine.

It is an object of this invention to provide a method for preparing dicarbocyanine dyestuffs according to the procedure of United States Patent 2,951,841, wherein lowering of the yield is avoided, despite the use of technical pyridine as the solvent-acid acceptor-condensing agent in the reaction mixture.

I have discovered that the aforesaid lowering in yield resulting from the use of technical pyridine in the preparation of dicarbocyanine dyestuffs can be virtually eliminated by heating the pyridine employed in the process with 0.1 to 5% of its weight of a hydrocarbon sulfonyl chloride. Preferably the pyridine is heated after addition of the hydrocarbon sulfonyl chloride, for ½ to 1 hour at elevated temperature (75° to 115° C.), then distilled from the resulting mixture, and then used in the preparation of the dicarbocyanine dyestuff. However, a substantial improvement in yield is also obtained merely by adding the hydrocarbon sulfonyl chloride to the pyridine and using the resulting mixture as a medium for preparing the dicarbocyanine dyestuff without preliminary distillation.

The invention will be more fully understood from the following examples wherein parts and percentages are by weight unless otherwise indicated.

Example 1

A. As a control, 350 grams of chemically pure pyridine (Baker's Analyzed), 152.5 grams of 2-methylbenzothiazole ethiodide and 110 grams of malonaldehyde diethyl ethyl methyl diacetal were charged to a flask having an agitator, a reflux condenser and a thermometer, and the mixture was heated with agitation at reflux temperature (112°–115° C.) for 2 hours. The mixture was then cooled to 25° C., and the resulting dicarbocyanine dyes which separated in the form of bright green crystals were recovered by filtration from the reaction mixture. The filter cake was washed with 100 ml. of pure pyridine, followed by 300 ml. of water, and then dried at 90° C. 102 grams were obtained of a dyestuff having the formula

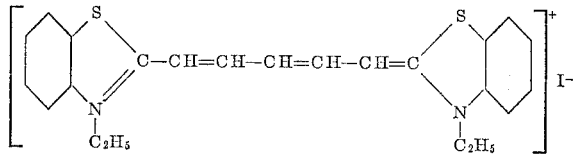

in the form of lustrous green crystals amounting to 78.8% of the theoretical yield.

B. The process of A above was repeated except that chemically pure pyridine was replaced by technical pyridine obtained from The Koppers Company, Tar Products Division. The yield in this case amounted to 87 grams of the dyestuff, corresponding to 67.2% of theory.

C. To illustrate the process of the invention, technical pyridine from the same batch employed in B above was heated at 110° C. with 2% of its weight of benzene sulfonyl chloride and then distilled from the resulting mixture at atmospheric pressure. The process of B was repeated substituting the pyridine distillate thus obtained for the technical pyridine previously employed. 99 grams of dyestuff were obtained, corresponding to a yield of 76.5% of theory.

D. For further control purposes, technical pyridine of the same batch employed in B above was heated as in C at 110° C. for 1 hour, but without inclusion of hydrocarbon sulfonyl chloride, and then distilled at atmospheric pressure. The process of C above was repeated substituting the pyridine distillate thus obtained for the distillate from the sulfonyl chloride treated technical pyridine previously used. The yield of dicarbocyanine deystuff amounted to 88 grams corresponding to 68% of theory.

E. The procedure of C above was repeated, except that hexane sulfonyl chloride was substituted for benzene sulfonyl chloride in pre-treating the pyridine. 98.4 grams of dicarbocyanine dyestuff were recovered, amounting to a yield of 75.9% of theory.

F. The procedure of C above was repeated, substituting a quantity of p-toluene sulfonyl chloride amounting to 1% by weight of the pyridine, for the benzene sulfonyl chloride employed in the pyridine pre-treatment of C. The yield of dicarbocyanine dyestuff obtained was 99.6 grams corresponding to 76.9% of theory.

*Example 2*

The procedures of Example 1–B, C and D were repeated except that the pyridine previously employed was replaced by an equal quantity of technical pyridine from a different source (Allied Chemical Corporation, Plastics and Coal Chemicals Division). The yields of the dyestuffs thus obtained were respectively 87.4 grams, 97.8 grams and 87.8 grams corresponding to 67.5%, 75.6% and 67.8% of theory.

*Example 3*

35 grams of 2-methylbenzoselenazole ethiodide and 21 grams of malonaldehyde diethyl methyl ethyl acetal were added to 150 ml. of chemically pure pyridine (Baker's Analyzed) and the mixture heated to reflux for 2 hours at 112°–115° C. The resulting dicarbocyanine dyestuff was recovered from the reaction mixture in the same manner described in Example 1–A, the product having the following formula:

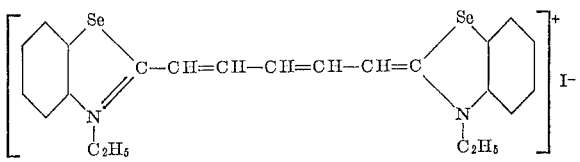

Repetition of the procedure, substituting for chemically pure pyridine a similar quantity of the technical pyridine employed in Example 2 resulted in a yield 10% less than that originally obtained. However, after adding 2% of its weight of benzene sulfonyl chloride, to a quantity of technical pyridine, heating at 110° C. for 1 hour, distilling the pyridine from the resulting mixture and substituting the pyridine distillate for chemically pure pyridine in carrying out the procedure of this example, the dyestuff yield was substantially the same as when chemically pure pyridine was used.

*Example 4*

Example 3 was repeated, except that an equi-molecular amount of 6-methoxy-2-methylbenzoxazole ethiodide was substituted for 2-methylbenzoselenazole ethiodide of Example 3. The dyestuff thus produced had the formula:

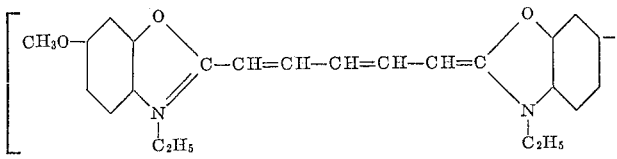

The yield obtained when using technical pyridine, purified as above by heating with benzene sulfonyl chloride, was the same as that obtained with chemically pure pyridine and about 10% greater than that recovered when using the same technical pyridine without the benzene sulfonyl chloride pre-treatment.

*Example 5*

Repetition of Example 3, substituting an equi-molecular amount of 2,6-dimethylbenzothiazole ethiodide for 2-methylbenzoselenazole ethiodide yields a dicarbocyanine dyestuff having the formula:

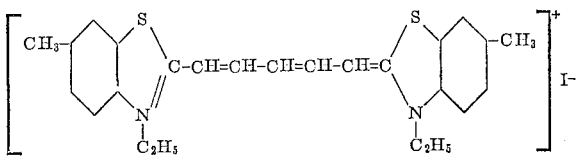

This product is obtained in similar yields using chemically pure pyridine in one case, and in the other, the distillate obtained by heating technical pyridine with benzene sulfonyl chloride and distilling the pyridine from the resulting mixture. By comparison, the yield obtained using the same technical pyridine without said pre-treatment and distillation is about 10% less than the first mentioned yields.

*Example 6*

Repetition of Example 3, substituting for 2-methyl benzoselenazole ethiodide an equivalent amount of 2,6-dimethyl quinoline ethiodide, yields a dyestuff having the formula:

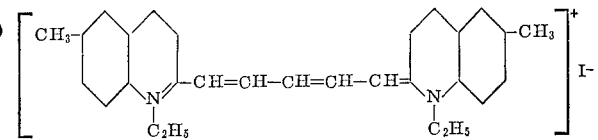

Similar yields are obtained using chemically pure pyridine and technical pyridine, purified by heating with benzene sulfonyl chloride and distillation of the resulting mixture, said yields being about 10% higher than the yield obtained using technical pyridine without said pre-treatment with a hydrocarbon sulfonyl chloride.

*Example 7*

Repetition of the procedure of Example 3 using, instead of 2-methylbenzoselenazole ethiodide, equivalent amounts of other N-heterocyclic base ethiodides having an active alkyl group in the alpha or gamma position (with reference to the heterocyclic nitrogen) yields dicarbocyanine dyes. The yields using chemically pure pyridine and technical pyridine purified by heating with benzene sulfonyl chloride and distilling are similarly about 10% higher than obtained using technical pyridine without pre-treatment with a hydrocarbon sulfonyl chloride.

*Example 8*

Repetition of Examples 3 to 7 inclusive, but substituting for the pyridine employed therein an equal amount of a mixture of the same pyridine and isopropanol in a ratio of 1:3 produced the same dyestuffs. The yields obtained using for said mixture chemically pure pyridine or pyridine pre-treated with benzene sulfonyl chloride and distilled, are between 5 and 10% higher than the yields obtained when similarly using technical pyridine without a preliminary treatment thereof with a hydrocarbon sulfonyl chloride.

*Example 9*

The procedure of Example 1–B was repeated, except that 0.4 gram of p-toluene sulfonyl chloride were added to the reaction mixture before heating to reaction temperature. The yield of dicarbocyanine dyestuff thus obtained amounted to 95.4 grams corresponding to 73.5% of theory, as compared with 67.2% obtained in Example 1–B.

Hydrocarbon sulfonyl chlorides suitable for use in the process of this invention can be of the aliphatic, araliphatic, cycloaliphatic or aromatic series. Nuclear or chain substituents which are unreactive under the conditions of treatment of the pyridine, as well as under the conditions with dicarbocyanine intermediates may be present in addition to the sulfonyl chloride radical (e.g. Cl, Br, $NO_2$, lower alkoxy groups and the like). While the molecular weight is not critical, the hydrocarbon radical of the sulfonyl chloride preferably contains not substantially more than 25 carbon atoms. Suitable sulfonyl chlorides include, in addition to those of the foregoing examples, ethane sulfonyl chloride, hexadecane sulfonyl chloride, cyclohexane sulfonyl chloride, phenylmethane sulfonyl chloride, tetralin sulfonyl chloride, naphthalene-α- and -β-sulfonyl chloride, abietin sulfonyl chloride, β-chloroethane sulfonyl chloride, and nitrobenzene sulfonyl chloride.

Technical pyridine employed in the process of the invention, can be obtained from coal tar, bone oil or similar pyrogenous nitrogen-containing distillates, or by synthesis from acetaldehyde and ammonia. Technical grades of pyridine from these sources contain at least 1% of nitrogen bases other than pyridine.

The quantity of hydrocarbon sulfonyl chloride added to the technical pyridine in the procedure of this invention ranges, as indicated above, from 0.1 to 5% of the weight of the pyridine. When relatively high molecular weight sulfonyl chlorides are employed or comparatively impure technical pyridine is used, higher proportions of the sulfonyl chloride within the aforesaid range are preferably employed.

In the preferred procedure according to the invention, the mixture of technical pyridine and sulfonyl chloride is heated to a temperature of 75° to 115° C. and the pyridine then distilled. Such heating may be carried out incidental to the distillation, but optimum results are obtained by pre-heating the mixture at a temperature within the aforesaid range for 30 minutes to 1 hour in advance of the distillation. The distillation can then be carried out at atmospheric or reduced pressure.

In case the mixture of pyridine and hydrocarbon sulfonyl chloride is not distilled, but employed as such as a reaction medium for the condensation of malonaldehyde diacetal with the N-heterocyclic dicarbocyanine intermediate, the reaction mixture is itself raised to a reaction temperature within the range of 75° to 115° C., and thus causes the desired effect of the sulfonyl chloride upon the pyridine to avoid lowering of the dyestuff yield.

The process of the invention can be advantageously employed in the preparation of any dicarbocyanine dyestuff of United States Patent 2,951,841, by condensation of malonaldehyde acetal in the presence of technical pyridine with a nitrogeneous heterocyclic dicarbocyanine dyestuff intermediate of the formula:

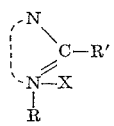

wherein R represents an alkyl or aralkyl group, R' a lower alkyl group such as methyl, X the anion of a salt-forming acid, and Z the residue of a heterocyclic nucleus of which a 5 to 6 membered ring includes the nitrogen atom of the above formula.

Variations and modifications which will be obvious to those skilled in the art can be made in the foregoing examples without departing from the spirit or scope of the invention.

I claim:

1. In a process for the preparation of dicarbocyanine dyestuffs involving condensation of a malonaldehyde diacetal of the formula

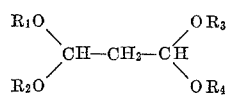

wherein $R_1$, $R_2$, $R_3$ and $R_4$ each represent an alkyl group of 1 to 8 carbon atoms with a nitrogenous heterocyclic compound of the general formula

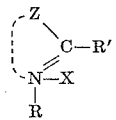

wherein R represents a lower alkyl group, R' represents a lower alkyl group, X represents the anion of a salt-forming acid, and Z represents a heterocyclic nucleus selected from the group consisting of thiazole-, oxazole-, selenazole-, indoline-, oxazoline-, thiazoline-, selenazoline-, pyridine-, lepidine-, imidoazole-, quinoline- and thiodiazole-nuclei, by heating a mixture of said compounds with technical pyridine, the improvement which comprises heating said pyridine with 0.5 to 1% of its weight of a hydrocarbon sulfonyl chloride at a temperature of 75° to 115° C. prior to completion of said condensation, such substituents as are present in said hydrocarbon sulfonyl chloride in addition to the sulfonyl chloride radical being unreactive under said conditions of pyridine treatment as well as of said malonaldehyde diacetal-nitrogenous heterocyclic compound condensation.

2. The process as defined in claim 1 wherein said pyridine is distilled from the mixture thereof with said hydrocarbon sulfonyl chloride, and then mixed with said malonaldehyde diacetal and said nitrogenous heterocyclic compound.

3. A process as defined in claim 2 wherein said pyridine is employed together with an inert liquid diluent in an amount not substantially exceeding 3 times the weight of the pyridine, the combined weight of the pyridine and diluent amounting to 2 to 4 times the combined weights of said malonaldehyde diacetal and said nitrogenous heterocyclic compound.

4. A process as defined in claim 2 wherein pyridine alone is employed as the reaction medium for said condensation in an amount corresponding to 2 to 4 times the combined weight of said malonaldehyde diacetal and said heterocyclic nitrogenous compound.

5. A process as defined in claim 1 wherein said hydrocarbon sulfonyl chloride is benzene sulfonyl chloride.

6. A process as defined in claim 1 wherein said hydrocarbon sulfonyl chloride is toluene sulfonyl chloride.

7. A process as defined in claim 1 wherein said hydrocarbon sulfonyl chloride is hexane sulfonyl chloride.

8. A process as defined in claim 1 wherein said hydrocarbon sulfonyl chloride is incorporated in the reaction mixture together with said malonaldehyde diacetal, said nitrogenous heterocyclic compound and technical pyridine, and the resulting mixture is heated at a temperature of 75° to 115° C. to effect said condensation.

References Cited by the Examiner

UNITED STATES PATENTS

| | | | |
|---|---|---|---|
| 1,863,679 | 6/1932 | Wahl | 260—240.5 |
| 2,746,923 | 5/1956 | Gerhardt et al. | 260—294.8 |
| 2,951,841 | 9/1960 | Wilson | 260—240.5 |
| 2,984,664 | 5/1961 | Fry et al. | 260—240.5 |

OTHER REFERENCES

MacArdle, "Use of Solvents," pages 107–111, D. Van Nostrand Co. (1925).

Chemical Abstracts, vol. 54, cols. 2325 to 2326 (1960) (Abstract of Foldi, Acta Chem. Acad. Sci. Hung., vol. 19, pages 205–16 (1959)).

Foldi, Chem. and Industry (London), 1958, pages 684–5.

WALTER A. MODANCE, *Primary Examiner.*

IRVING MARCUS, *Examiner.*

J. D. RANDOLPH, *Assistant Examiner.*